US012646785B2

(12) United States Patent
Matsueda

(10) Patent No.: US 12,646,785 B2
(45) Date of Patent: Jun. 2, 2026

(54) BATTERY MOUNTING STRUCTURE OF FRAME VEHICLE

(71) Applicant: TOYOTA JIDOSHA KABUSHIKI KAISHA, Toyota (JP)

(72) Inventor: Koji Matsueda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

(21) Appl. No.: 18/359,026

(22) Filed: Jul. 26, 2023

(65) Prior Publication Data

US 2024/0120597 A1 Apr. 11, 2024

(30) Foreign Application Priority Data

Oct. 11, 2022 (JP) ................................. 2022-162916

(51) Int. Cl.
$H01M\ 50/249$ (2021.01)
$B60L\ 50/60$ (2019.01)
$B60L\ 50/64$ (2019.01)

(52) U.S. Cl.
CPC ........... *H01M 50/249* (2021.01); *B60L 50/64* (2019.02); *B60L 50/66* (2019.02); *H01M 2220/20* (2013.01)

(58) Field of Classification Search
CPC .... B60K 2001/0405; B60K 2001/0444; B60K 2001/0416; B60K 2001/0438; B60L 50/66
See application file for complete search history.

(56) References Cited

U.S. PATENT DOCUMENTS

| | | | | |
|---|---|---|---|---|
| 8,833,839 | B2 * | 9/2014 | Young | ................. B62D 25/025 |
| | | | | 296/187.08 |
| 11,084,366 | B2 * | 8/2021 | Hohm | ............... H01M 10/6555 |
| 12,370,876 | B1 * | 7/2025 | Kosbau | .................. B60L 50/66 |
| 2013/0020139 | A1 | 1/2013 | Kim et al. | |
| 2017/0222199 | A1 * | 8/2017 | Idikurt | ................... B60L 50/66 |
| 2017/0305248 | A1 * | 10/2017 | Hara | ....................... B60K 1/04 |
| 2018/0029493 | A1 * | 2/2018 | Kobayashi | .......... H01M 50/249 |
| 2021/0188069 | A1 | 6/2021 | Friedman | |
| 2021/0237550 | A1 * | 8/2021 | Kawase | ............... B60L 3/0007 |
| 2021/0291636 | A1 | 9/2021 | Bohmer et al. | |
| 2022/0410686 | A1 * | 12/2022 | Kumagai | ............... B62D 21/09 |
| 2024/0166040 | A1 * | 5/2024 | Coupal-Sikes | ..... H01M 50/204 |
| 2025/0262926 | A1 * | 8/2025 | Rollins | ................... B60L 50/66 |

FOREIGN PATENT DOCUMENTS

| | | |
|---|---|---|
| JP | 2012-101589 A | 5/2012 |
| JP | 2013-023206 A | 2/2013 |
| JP | 2021-084605 A | 6/2021 |
| JP | 2022-025814 A | 2/2022 |

* cited by examiner

*Primary Examiner* — Brian L Swenson
(74) *Attorney, Agent, or Firm* — SoraIP, Inc.

(57) ABSTRACT

A battery mounting structure for a frame vehicle supports a battery pack by a pair of left and right side frames extending in a vehicle front-rear direction. The battery pack is divided into multiple battery packs arranged along the vehicle length, and each divided battery pack is connected to the side frames through a support member extending in a vehicle width direction. Each divided battery pack inclines independently according to torsion of the side frames, and suppresses twisting and reducing the likelihood of battery failure.

2 Claims, 11 Drawing Sheets

BATTERY MOUNTING STRUCTURE OF FRAME VEHICLE

CROSS-REFERENCE TO RELATED APPLICATION

This application claims priority to Japanese Patent Application No. 2022-162916 filed on Oct. 11, 2022 incorporated herein by reference in its entirety.

BACKGROUND

1. Technical Field

The present disclosure relates to a mounting structure of a battery in an electrified vehicle, and more particularly, to a mounting structure of a battery in an electrified vehicle with a frame (hereinafter, also simply referred to as a "frame vehicle").

2. Description of Related Art

Conventionally, in an electrified vehicle driven by electric power supplied from a battery, a battery is generally mounted in such a manner that a battery pack in which a secondary battery such as a lithium-ion battery is systematized and stored in a case is supported by a pair of right and left side frames extending in a vehicle front-rear direction.

For example, Japanese Unexamined Patent Application Publication No. 2012-101589 (JP 2012-101589 A) discloses, in a so-called monocoque vehicle, a battery pack fixing structure of an electrified vehicle configured such that a bracket fixed to a housing (case) of a battery pack is fastened to a pair of right and left side frames extending in the vehicle front-rear direction to form a part of a skeleton of a vehicle body.

SUMMARY

By the way, as in JP 2012-101589 A, when the mounting structure for simply fastening the battery pack to the side frame is not applied to a monocoque vehicle but applied to a so-called frame vehicle in which a body (cabin) is mounted on a side frame via a cab mount or the like, there is a possibility that the following problems occur.

That is, unlike the monocoque vehicle in which the torsional rigidity of the side frame is relatively high due to integration of the side frame and the body, in the frame vehicle, the torsional rigidity of the side frame only is relatively low due to separation of the side frame and the body. Therefore, when the mounting structure in which the battery pack is simply fastened to the side frame is adopted in the frame vehicle, as in the monocoque vehicle, the battery pack fastened to the side frame is greatly twisted since the torsion angle of the side frame at the time of traveling (such as riding over a step) is large. This may lead to a failure of the battery.

The present disclosure has been made in view of such a point. An object of the present disclosure is to provide a battery mounting structure capable of suppressing a failure of the battery even when the torsion angle of the side frame supporting the battery pack increases in the frame vehicle in which the side frames and the body are separated from each other.

In order to achieve the above object, in the battery mounting structure of the frame vehicle according to the present disclosure, by dividing the battery pack into a plurality of battery packs in the vehicle front-rear direction, the divided individual battery packs are suppressed from being largely twisted.

Specifically, the present disclosure is directed to the battery mounting structure of the frame vehicle, the battery mounting structure for supporting the battery pack by a pair of right and left side frames that is provided in the frame vehicle and that extends in the vehicle front-rear direction.

The battery mounting structure of the frame vehicle is characterized in that: the battery pack is composed of a plurality of divided battery packs divided in the vehicle front-rear direction; and
each of the divided battery packs is connected to the side frames.

In this configuration, the battery pack is composed of the divided battery packs divided in the vehicle front-rear direction, and each of the divided battery packs are connected to the side frames. Therefore, even when the torsion angle of the side frame extending in the vehicle front-rear direction increases, each of the divided battery packs is only inclined in accordance with the torsion angle of each portion of the side frame to which each of the divided battery pack is connected. That is, even when each of the divided battery packs is inclined at a different angle in accordance with the torsion angle of each portion of the side frame to which each of the divided battery pack is connected, each of the divided battery packs is not largely twisted since the divided battery packs are separated from each other, in other words, the influence due to the difference in the inclination angle is eliminated. Accordingly, a failure of the battery can be suppressed.

Further, the battery mounting structure of the frame vehicle includes a plurality of support members that extends in a vehicle width direction and that extends across the right and left side frames.
Each of the divided battery packs may be fastened to each of the support members, and may be connected to the side frames via each of the support members.

According to this configuration, each of the divided battery packs can be easily supported on the side frames via each of the support members that connects the pair of right and left side frames in the vehicle width direction in the same manner as a cross member that supports a radiator, a spare tire, and the like.

Further, in the battery mounting structure of the frame vehicle, each of the support members may be connected to the side frames via a bolt or a rubber mount.

According to this configuration, when there is a restriction on an installation space or the like, each of the support members is connected to the side frames via a bolt. On the other hand, when it is desired to suppress the transmission of vibration from the side frames to the battery packs, each of the support members is connected to the side frames via a rubber mount. As described above, the bolt or the rubber mount can be appropriately selected according to the design conditions of each vehicle.

In the battery mounting structure of the frame vehicle, both ends of each of the divided battery packs in a vehicle width direction may be connected to the side frames.

According to this configuration, since the both ends of each of the divided battery packs in the vehicle width direction are directly connected to the side frames without passing through the support members extending across the side frames, the mounting structure can be simplified.

Further, in the battery mounting structure of the frame vehicle, the both ends of each of the divided battery packs may be connected to the side frames via a bolt or a rubber mount.

According to this configuration, even when each of the divided battery packs is directly connected to the side frames, the bolt or the rubber mount can be appropriately selected according to the design conditions of each vehicle.

In the battery mounting structure of the frame vehicle, the divided battery packs adjacent to each other may be connected to each other via an elastic member.

According to this configuration, since the divided battery packs adjacent to each other are connected to each other, in other words, since the battery packs can be handled as a single member, it is possible to increase convenience in logistics of the battery pack and in assembling the vehicle as compared with a case where the battery pack is composed of the divided battery packs that are completely separated.

Moreover, since the divided battery packs are connected to each other via the elastic member, it is possible to reduce the influence due to the difference in the inclination angle even when the divided battery packs adjacent to each other are inclined at different angles according to the torsion angle of each portion of the side frame. As a result, it is possible to suppress each of the divided battery packs from being largely twisted.

As described above, with the battery mounting structure of the frame vehicle according to the present disclosure, it is possible to suppress the failure of the battery even when the torsion angle of the side frame supporting the battery pack increases.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
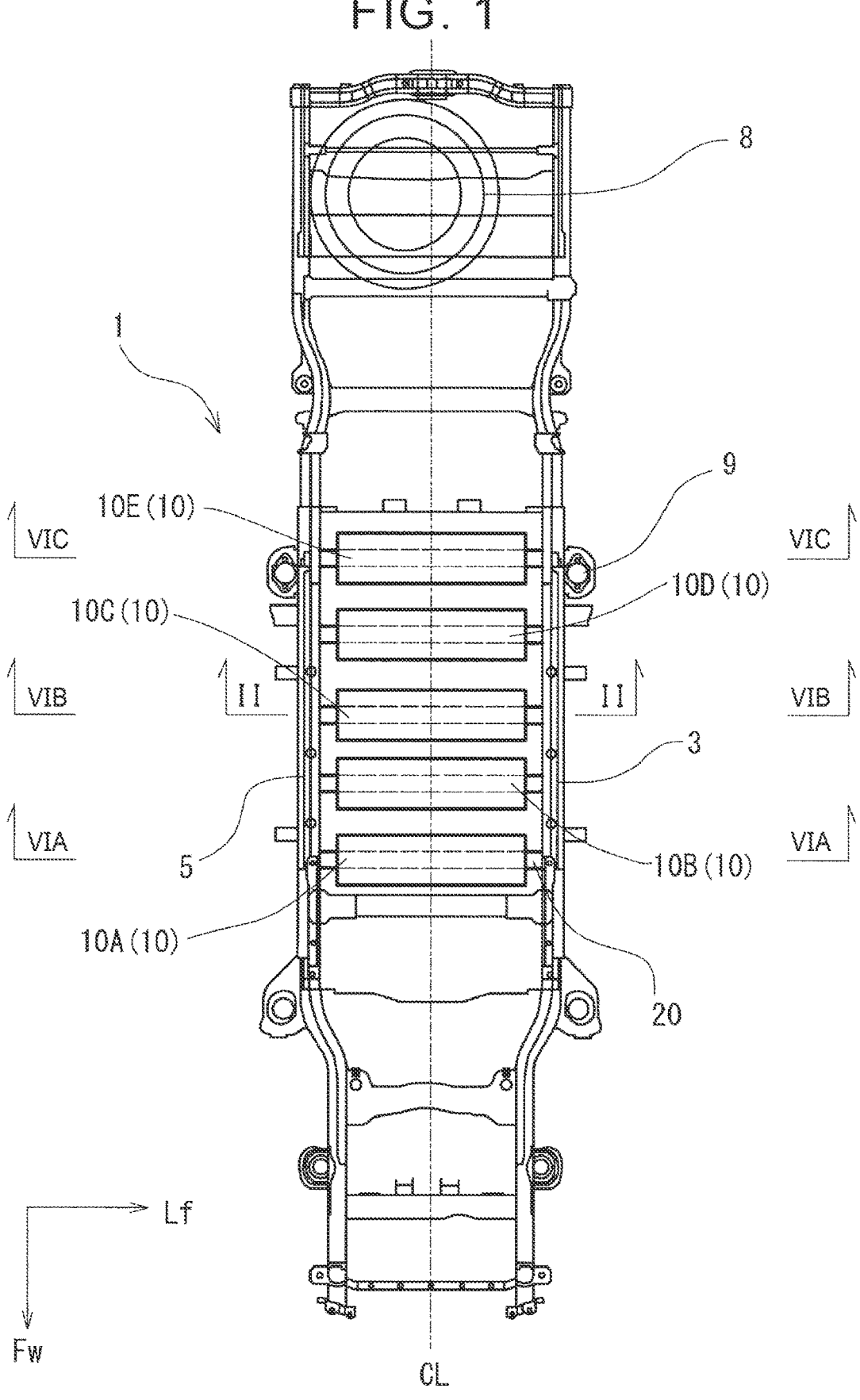
FIG. 1 is a plan view schematically showing a skeleton of a vehicle to which a battery mounting structure according to a first embodiment of the present disclosure is applied.

Hereinafter, embodiments of the present disclosure will be described with reference to the drawings. In the drawings, the arrow Fw indicates the front side in the vehicle front-rear direction, the arrow Lf indicates the left side in the vehicle width direction, and the arrow Up indicates the upper side.

Embodiment 1

Frame Car

Figure 2:
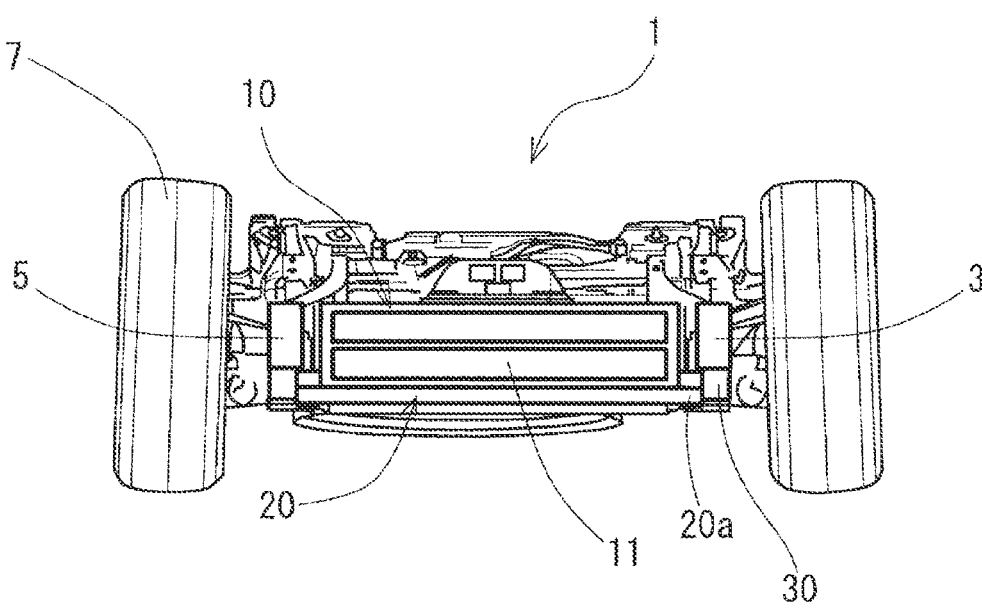
FIG. 2 is a cross-sectional view taken along II-II line of FIG. 1.
Figure 2:
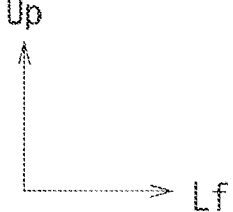

FIG. 1 is a plan view schematically showing a skeleton of a vehicle 1 to which a battery mounting structure according to the present embodiment is applied. FIG. 2 is a cross-sectional view taken along II-II line of FIG. 1. In FIG. 1, the left and right wheels 7 are not shown. As shown in FIG. 1, the vehicle 1 includes a pair of left and right side frames 3 and 5 extending in the vehicle front-rear direction.

The vehicle 1 is configured as an electrified vehicle driven by an electric motor (not shown) using the battery 11 as a main power source. At the same time, the vehicle 1 is configured as a so-called frame vehicle in which a body (cabin) (not shown) is mounted on the side frames 3 and 5 via a cab mount (not shown) attached to a plurality of mount attachment portions 9 fixed to the side frames 3 and 5. Therefore, in the following description, the vehicle 1 is also referred to as a "frame vehicle 1".

In this frame vehicle 1, a battery mounting structure is adopted in which a battery pack 10 in which a battery 11 is systematized into a case is supported by a pair of left and right side frames 3 and 5 as shown in FIGS. 1 and 2.

Battery Mounting Structure

Next, a battery mounting structure in the frame vehicle 1 will be described in detail. Prior to that, in order to facilitate understanding of the present embodiment, a battery mounting structure of a conventional frame vehicle will be described.

Figures 11A, 11B, 11C:
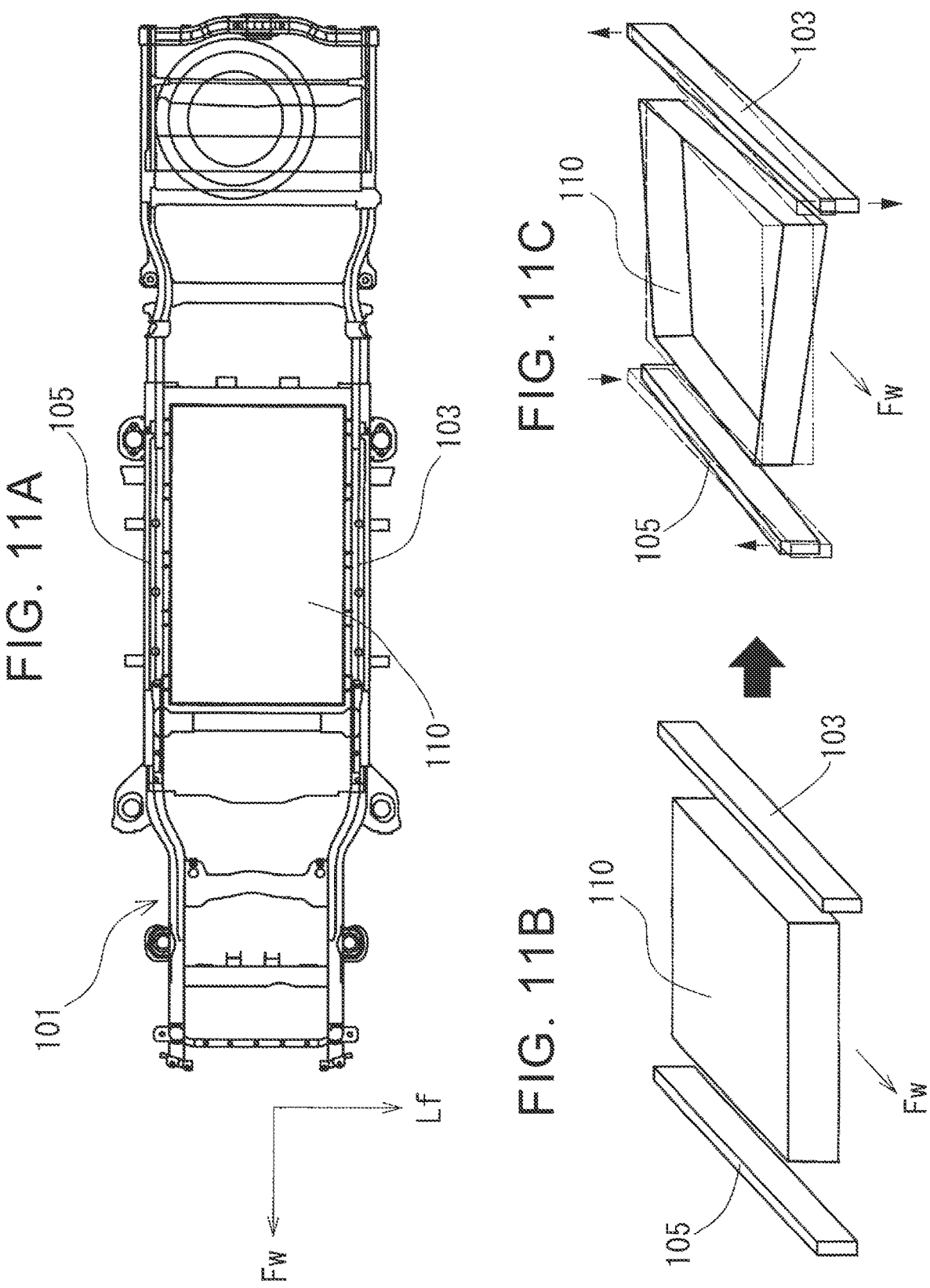
FIG. 11A is a diagram schematically illustrating a battery mounting structure of a conventional frame vehicle.
FIG. 11B is a diagram schematically illustrating a battery mounting structure of a conventional frame vehicle.
FIG. 11C is a diagram schematically illustrating a battery mounting structure of a conventional frame vehicle.

FIGS. 11A, 11B, and 11C schematically illustrate a battery mounting structure of a conventional frame vehicle 101. In the conventional frame vehicle 101, as shown in FIG. 11A, a structure in which the battery pack 110 is simply fastened to the side frame 103,105 is adopted, but such a battery mounting structure may have the following drawbacks.

That is, since the side frame and the body are integrated, unlike the monocoque vehicle having high torsional rigidity, the side frame 103,105 and the body are separated from each other in the frame vehicle 101, so that the torsional rigidity of only the side frame 103,105 is relatively low. Therefore, in the frame vehicle 101, when traveling (such as when riding over a level difference), as shown in FIG. 11B, for example, as shown in FIG. 11C, the front end of the left side frame 103 is lowered and the rear end is raised, while the front end of the right side frame 105 is raised and the rear end is lowered, when the twist angle of the side frame 103,105 is increased, the battery pack 110 to be fastened to the side frame 103,105 is greatly twisted. This may lead to a failure of the battery.

Figures 3A, 3B:
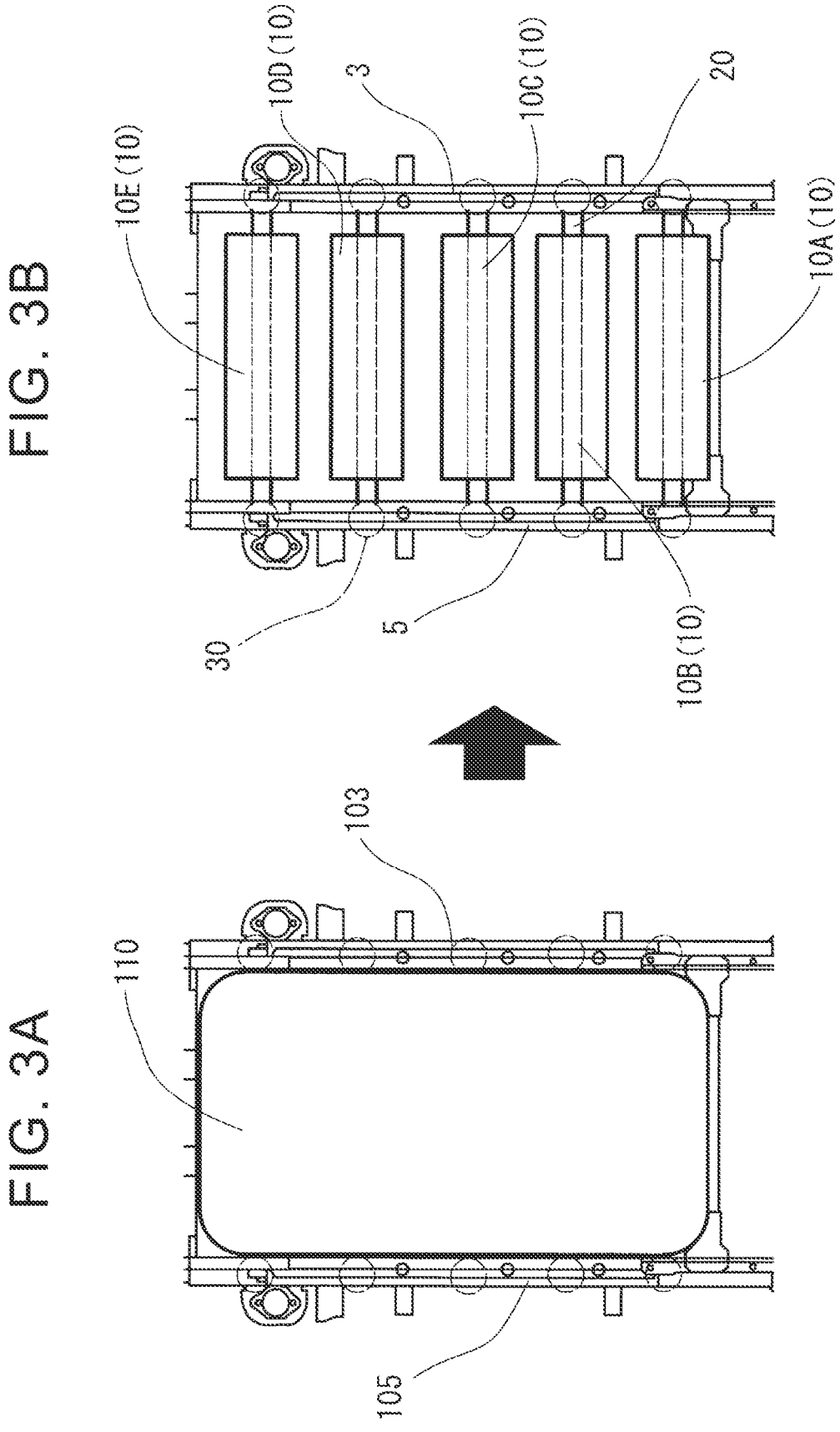
FIG. 3A is a plan view schematically illustrating a battery mounting structure.
FIG. 3B is a plan view schematically illustrating a battery mounting structure.

Therefore, in the battery mounting structure of the frame vehicle 1 according to the present embodiment, as shown in FIG. 3A, a single battery pack 110 conventionally supported by the side frame 103,105 is divided into a plurality of parts in the vehicle front-rear direction as shown in FIG. 3B. As a result, even when the torsion angles of the side frames 3 and 5 to which the battery pack 10 is connected are increased, the divided individual battery pack 10A,10B,10C, 10D,10E are prevented from being greatly twisted.

More specifically, the battery pack 10 includes five divided battery packs 10A,10B,10C,10D,10E divided in the front-rear direction. The number of divisions of the battery pack 10 is determined in accordance with the dimensions and characteristics of the side frames 3 and 5 and the battery pack 10. Specifically, the maximum torsion angle of the side frames 3 and 5 during traveling is calculated. If the calculated maximum torsion angle exceeds the limit torsion angle of the battery pack 10, the battery pack 10 is divided into two. In this way, the maximum torsion angle of the side frames 3 and 5 during traveling is calculated in the span length divided into two. If the calculated maximum torsion angle exceeds the limit torsion angle of the two divided battery packs 10, the battery packs 10 are further divided into three. In this way, the maximum torsion angle of the side frames 3 and 5 during traveling is calculated in the span length divided into three. If the calculated maximum torsion angle exceeds the limit torsion angle of the three divided battery packs 10, the battery packs 10 are further divided into four. The number of divisions of the battery pack 10 is determined by repeating such a method until the maximum torsion angle of the side frames 3 and 5 during traveling becomes equal to or less than the limit torsion angle of the divided battery pack 10.

As shown in FIGS. 1 and 2, and FIG. 3B, the divided battery packs 10A,10B, . . . divided into five in this manner are connected to the side frames 3 and 5, respectively, via the support member 20. More specifically, the battery mounting structure of the present embodiment includes the same number (five) of support members 20 as the divided battery pack 10A,10B, . . . . Each support member 20 extends in the vehicle width direction, for example, is formed in a hollow rectangular cross section made of metal, and extends over the pair of left and right side frames 3 and 5. Each of the divided battery packs 10A,10B, . . . is supported by each of the support members 20 by being bolted while being placed on each of the support members 20. Both end portions 20a of the respective support members 20 are connected to the side frames 3 and 5 via the mounting portions 30. That is, the support member 20 extends over the pair of left and right side frames 3 and 5 in the frame vehicle 1, and performs the same function as a cross member that supports a radiator (not shown), a spare tire 8, and the like.

Figure 4:
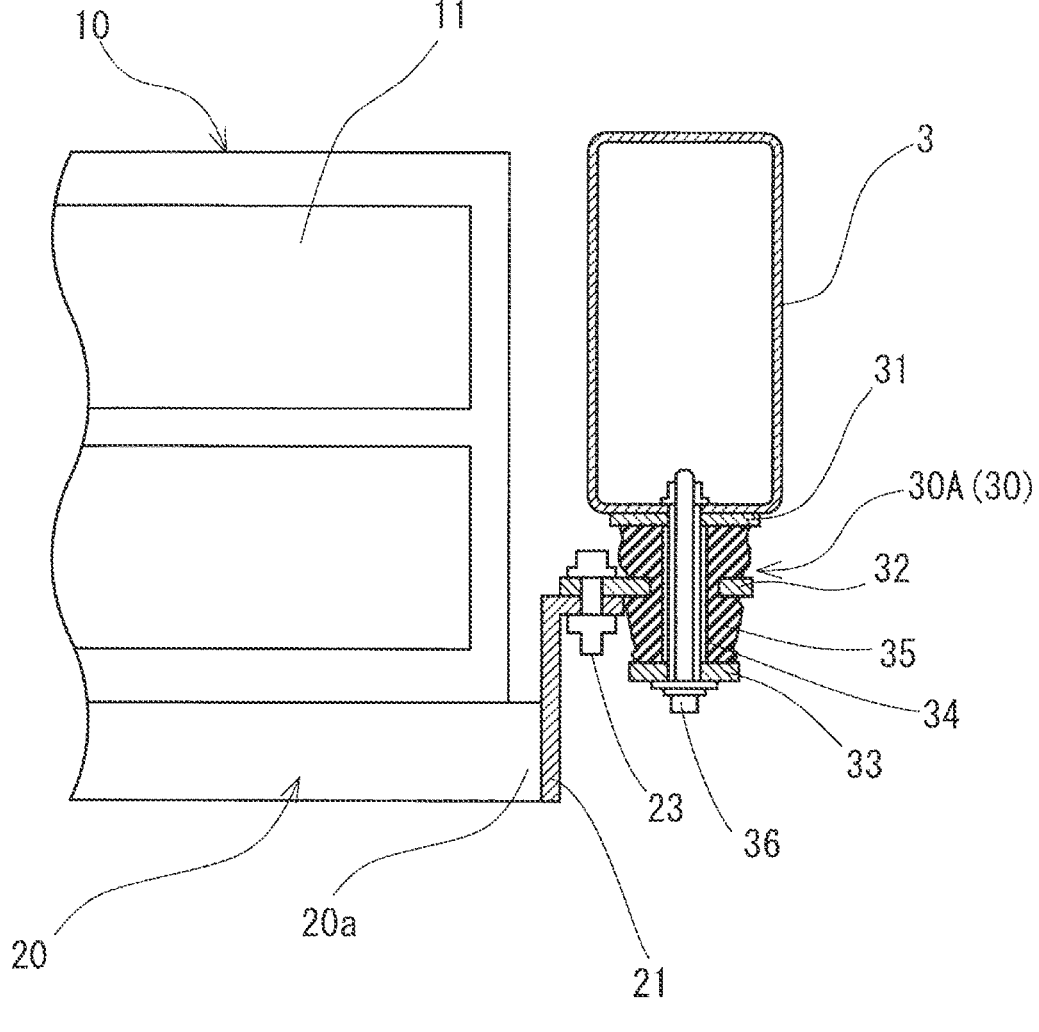
FIG. 4 is a cross-sectional view schematically illustrating an example of a mounting portion.

FIG. 4 is a cross-sectional view schematically illustrating an example of the mounting portion 30. In the embodiment shown in FIG. 4, the mounting portion 30 is made of a rubber mount 30A. The rubber mount 30A includes a cylindrical collar 34, an upper plate 31 fixed to an upper end portion of the collar 34, a lower plate 33 fixed to a lower end portion of the collar 34, a rubber 35 provided so as to cover an outer periphery of the collar 34 and bonded to the upper plate 31 and the lower plate 33, and a middle plate 32 attached to a central portion of the rubber 35 and moving up and down with deformation of the rubber 35. The rubber mount 30A is fixed to the side frame 3 with the upper plate 31 contacting the lower surface of the side frame 3 by bolts 36 inserted into the collar 34 from below.

Brackets 21 are provided on the vehicle-width-direction end 20a of the support member 20. The brackets 21 and the middle plate 32 are fastened by bolts 23, so that the support members 20 are connected to the side frames 3 and 5 via the rubber mount 30A. That is, the divided battery packs 10A, 10B, . . . are connected (supported) to the side frames 3 and 5 via the support member 20 and the rubber mount 30A. As a result, vibration from the side frames 3 and 5 is absorbed by the rubber mount 30A, so that vibration transmission to the battery 11 can be suppressed.

Action and Effect

Figure 5:
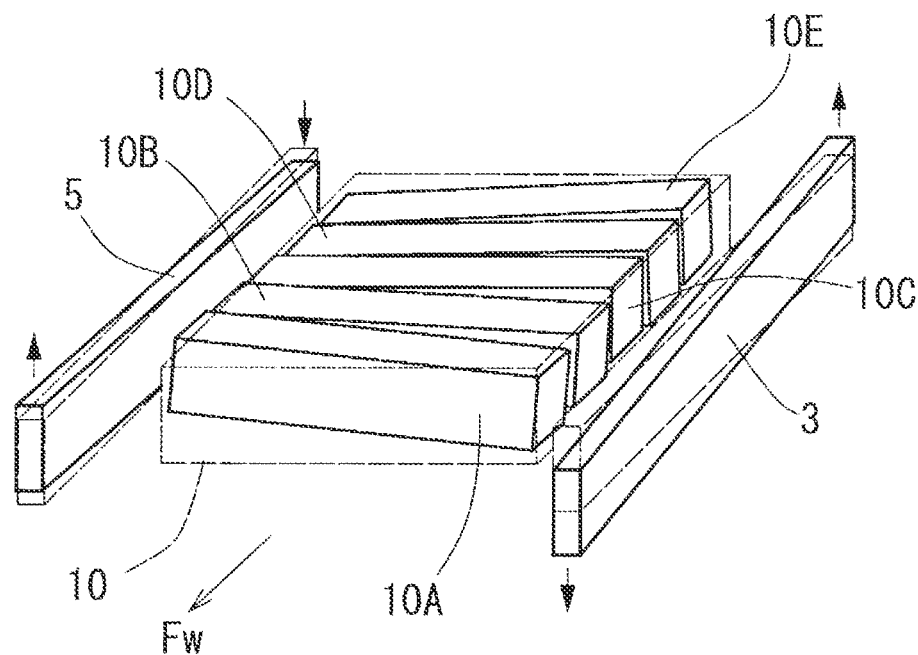
FIG. 5 is a perspective view schematically showing the behavior of the divided battery pack when the torsion angle of the side frame increases.
Figure 6A:
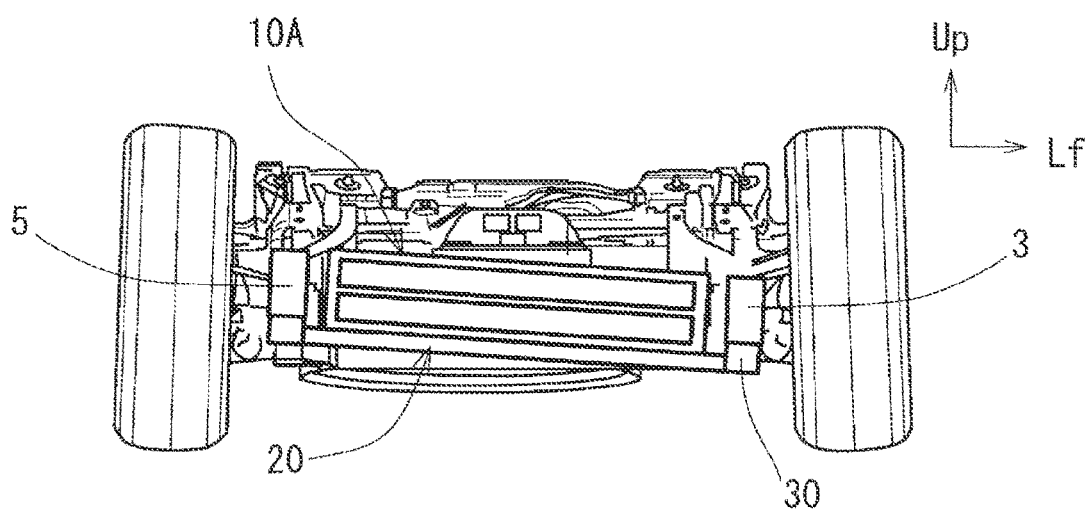
FIG. 6A is a cross-sectional view taken along VIA-VIA line of FIG. 1, showing the behavior of the divided battery pack when frame has a large torsion angle.
Figure 6B:
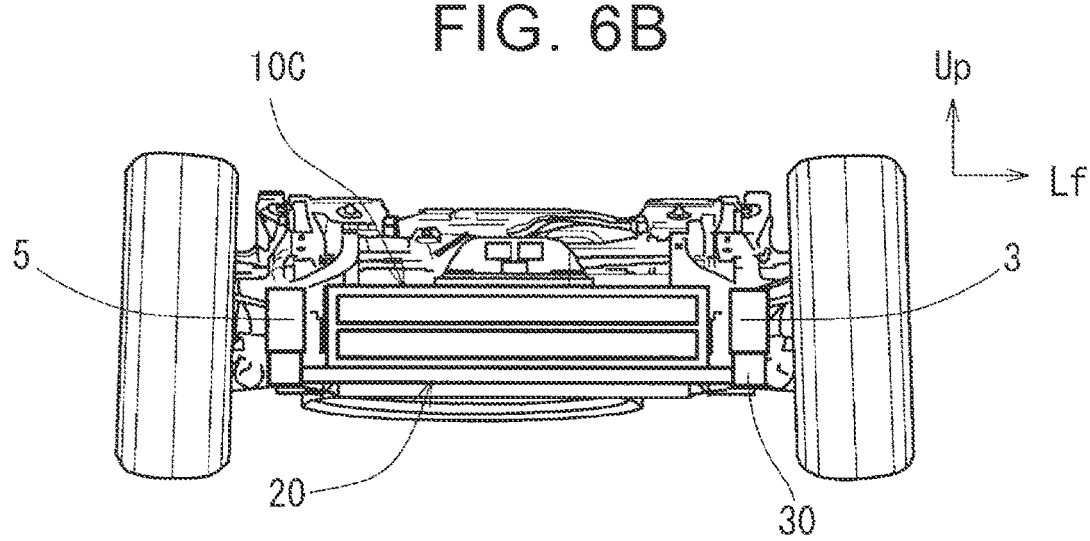
FIG. 6B is a cross-sectional view taken along VIB-VIB line of FIG. 1, showing the behavior of the divided battery pack when frame has a large torsion angle.
Figure 6C:
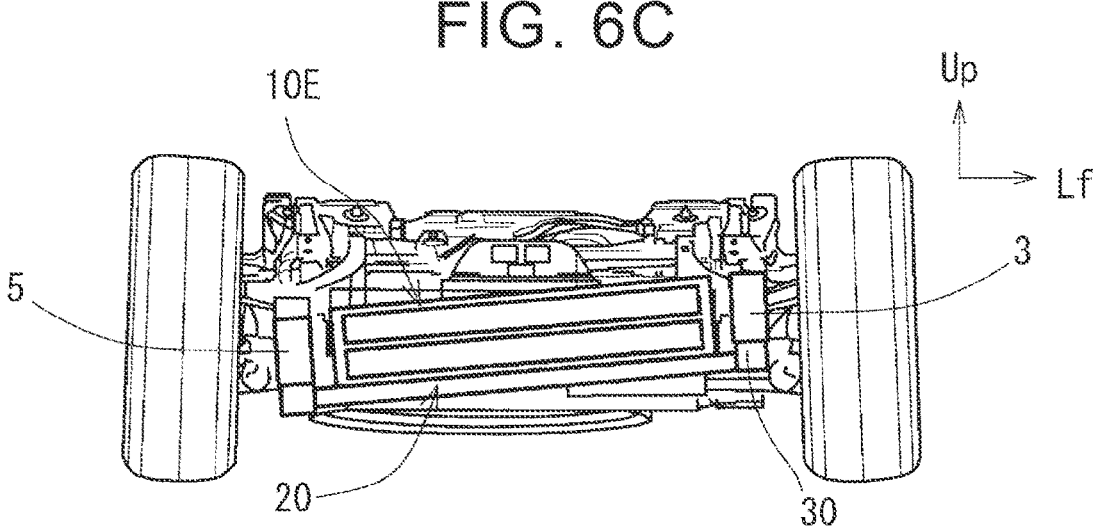
FIG. 6C is a cross-sectional view taken along VIC-VIC line of FIG. 1, showing the behavior of the divided battery pack when frame has a large torsion angle.

FIG. 5 is a perspective view schematically showing the behavior of the divided battery pack 10A,10B, . . . when the torsion angles of the side frames 3 and 5 are increased. Further, FIGS. 6A, 6B, and 6C are diagrams schematically illustrating the behavior of the divided battery pack 10A, 10B, . . . when the torsion angles of the side frames 3 and 5 are increased. FIG. 6A is an arrow sectional view of the line VIA-VIA of FIG. 1. FIG. 6B is a cross-sectional view taken along a VIB-VIB line of FIG. 1. FIG. 6C is a cross-sectional view taken along a VIC-VIC line of FIG. 1.

For example, as shown in FIG. 5, the front end of the left side frame 3 is lowered and the rear end thereof is raised, while the front end of the right side frame 5 is raised and the rear end thereof is lowered, when the torsion angles of the side frames 3 and 5 are increased, the divided battery pack 10A,10B, . . . behave differently.

More specifically, as shown in FIG. 6A, when the left side frame 3 is lowered and the right side frame 5 is raised, the divided battery pack 10A connected to the side frames 3 and 5 via the support member 20 is greatly inclined in the leftward downward direction. As described above, even if the divided battery pack 10A is greatly inclined downward to the left, the divided battery pack 10A and the neighboring divided battery pack 10B are separated from each other, and therefore, the divided battery pack 10A and the divided battery pack 10B are only inclined independently, and the torsion angle is not generated between the two divided battery packs 10A,10B.

Similarly, as shown in FIG. 6C, when the left side frame 3 is raised while the right side frame 5 is lowered, the divided battery packs 10E connected to the side frames 3 and 5 via the support member 20 are greatly inclined downward in the right direction. As described above, even if the divided battery pack 10E is greatly inclined downward to the right, the divided battery pack 10E and the neighboring divided battery pack 10D are separated from each other, and therefore, only the divided battery pack 10E and the divided battery pack 10D are inclined independently, and the torsion angle is not generated between the two divided battery packs 10E,10D.

In addition, the center portions of the side frames 3 and 5 in the vehicle front-rear direction are hardly displaced. As a result, the divided battery pack 10C connected to the central portion via the support member 20 is hardly displaced, as shown in FIG. 6B. Thus, since the divided battery pack 10C is separated from the front and rear divided battery pack 10B,10D, even if the divided battery pack 10B is inclined downward to the left and the divided battery pack 10D is inclined downward to the right, it is not affected by these effects and the torsion angle is not generated.

That is, in the battery mounting structure of the frame vehicle 1 according to the present embodiment, even when the torsion angle of the side frames 3 and 5 increases, the divided battery packs 10A,10B, . . . are only inclined in accordance with the torsion angle of the respective portions of the side frames 3 and 5 connected to each other. As described above, since the divided battery pack 10A,10B, . . . are separated from each other even when the divided battery pack is inclined at different angles according to the torsion angles of the respective portions of the side frames 3 and 5 connected thereto, the divided battery pack 10A, 10B, . . . are not significantly twisted in the divided battery pack 10A,10B, . . . (the divided battery pack is only slightly twisted according to the relatively small torsion angles of the respective portions of the side frames 3 and 5 having a short span length). As a result, a failure of the battery 11 can be suppressed.

Embodiment 2

The present embodiment differs from the first embodiment in that the divided battery pack 10A,10B, . . . is connected to the side frames 3 and 5. Hereinafter, differences from the first embodiment will be mainly described.

Figure 7:
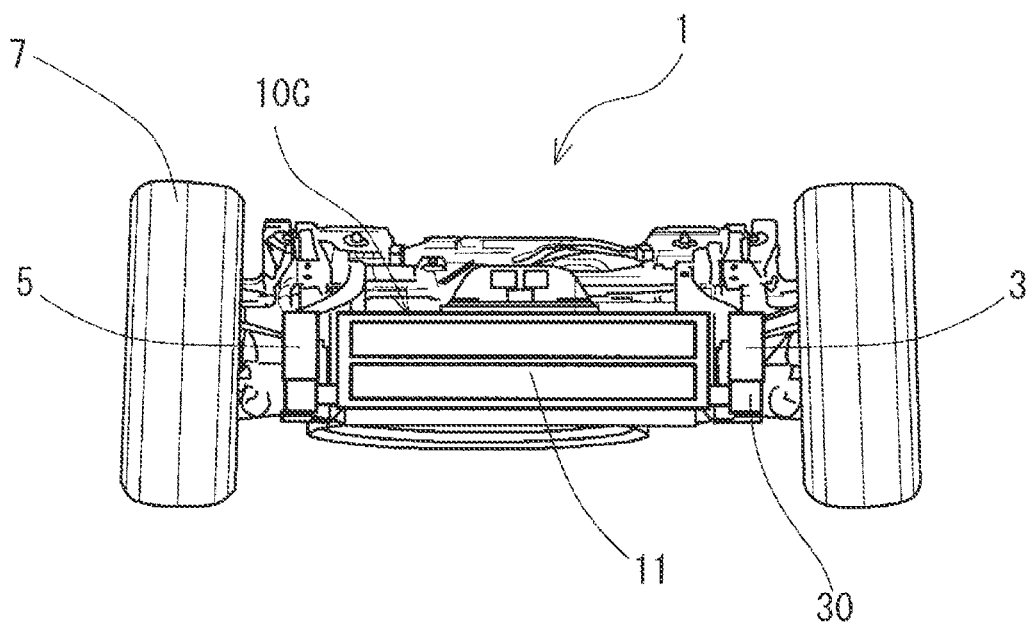
FIG. 7 is a cross-sectional view schematically showing a battery mounting structure according to Embodiment 2 of the present disclosure.
Figure 7:
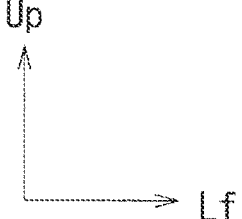
Figure 8:
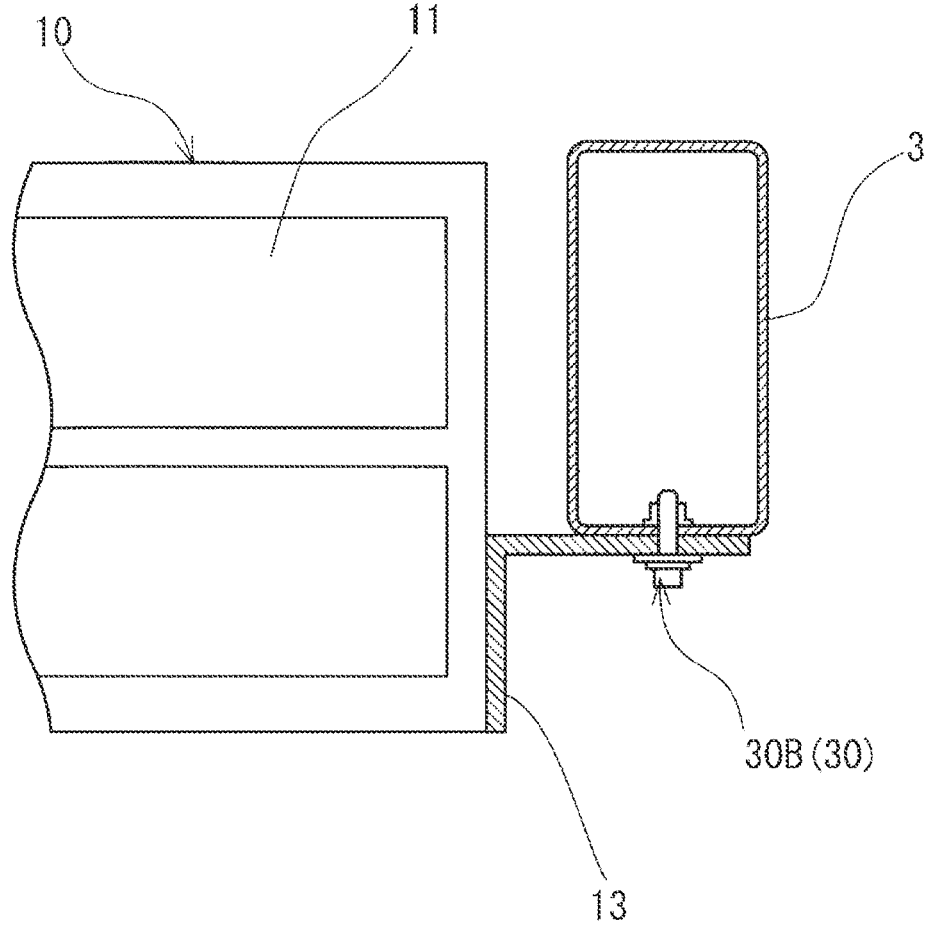
FIG. 8 is a cross-sectional view schematically illustrating an example of a mounting portion.

FIG. 7 is a cross-sectional view schematically illustrating a battery mounting structure according to the present embodiment. FIG. 8 is a cross-sectional view schematically illustrating an example of the mounting portion 30. Since the support modes of the five divided battery pack 10A,10B, . . . are substantially the same, the divided battery pack 10C will be described below. In the present embodiment, as shown in FIG. 7, both end portions of the divided battery pack 10C are connected to the side frames 3 and 5 via the mounting portions 30.

The mounting portion 30 may be formed of a rubber mount 30A as in the first embodiment, or may be formed of a bolt 30B unlike the first embodiment.

For example, when the mounting portion 30 is formed of a rubber mount 30A, the middle plate 32 of the rubber mount 30A fixed to the side frame 3 as shown in FIG. 4 may be connected to the end portion of the divided battery pack 10C.

On the other hand, when the mounting portion 30 is formed of a bolt 30B, as shown in FIG. 8, the bracket 13 may be provided at the end portion of the divided battery pack 10C, and the bracket 13 may be fastened to the lower surface of the side frame 3 by a bolt 30B.

Action and Effect

According to the present embodiment, since both end portions of the divided battery packs 10A,10B, . . . in the vehicle width-direction are directly connected to the side frames 3 and 5 without using the support member 20, the mounting configuration can be simplified as compared with the first embodiment. In addition, if the mounting portion 30 is formed of a bolt 30B, the mounting configuration can be further simplified.

Embodiment 3

The present embodiment differs from the second embodiment in that adjacent divided battery packs 10A,10B, . . . are connected to each other via elastic members. Hereinafter, differences from the second embodiment will be mainly described.

Figure 9:
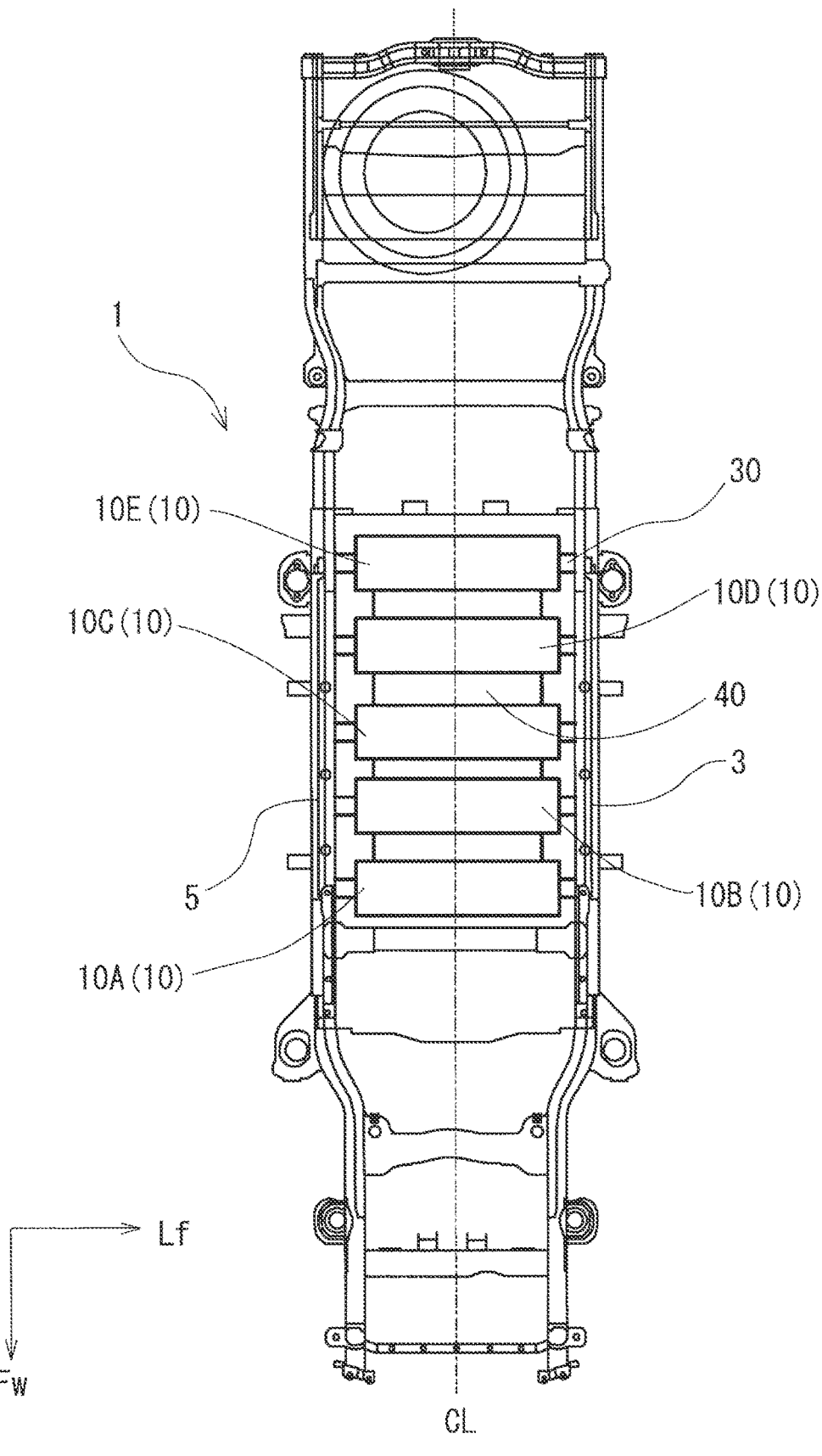
FIG. 9 is a plan view schematically showing a battery mounting structure according to Embodiment 3 of the present disclosure.

FIG. 9 is a plan view schematically illustrating a battery mounting structure according to the present embodiment. In the present embodiment, as shown in FIG. 9, adjacent divided battery packs 10A,10B, . . . are connected to each other via an elastic member 40. In the divided battery pack 10A,10B, . . . , as in the second embodiment, both end portions in the vehicle width-direction are connected to the side frames 3 and 5 via the mounting portions 30.

The elastic member 40 connects the divided battery pack 10A and the divided battery pack 10B, the divided battery pack 10B and the divided battery pack 10C, the divided battery pack 10C and the divided battery pack 10D, and the divided battery pack 10D and the divided battery pack 10E, respectively, in the front and back directions. The elastic member 40 is, for example, a soft rubber around an axis in the vehicle front-rear direction, so that even if one of the divided battery packs adjacent to each other is inclined in accordance with the torsion angle of each portion of the side frames 3 and 5 connected thereto, the inclination of the other divided battery pack is not affected.

Action and Effect

According to the present embodiment, since the adjacent divided battery packs 10A,10B, . . . are connected to each other, in other words, the battery pack 10 can be handled as a single member, so that convenience in logistics of the battery pack 10 and in assembling vehicles can be improved as compared with a case where the battery pack 10 is configured with a completely separated divided battery pack 10A,10B, . . . .

Moreover, since the divided battery pack 10A,10B, . . . are connected to each other via the soft elastic member 40 around the shaft in the front-rear direction of the vehicle, even if the adjacent divided battery packs 10A,10B, . . . are inclined at different angles according to the torsion angles of the respective portions of the side frames 3 and 5, it is possible to alleviate the effect of the difference in inclination. As a result, it is possible to prevent the divided battery packs 10A,10B, . . . from being significantly twisted.

Other Embodiments

The present disclosure is not limited to the embodiments, but may be embodied in various other forms without departing from the spirit or essential characteristics thereof.

In the first embodiment, the mounting portion 30 is formed of a rubber mount 30A, and the support member 20 is connected to the side frames 3 and 5 via the rubber mount 30A. However, the present disclosure is not limited thereto, and the mounting portion 30 may be formed of a bolt 30B, and the brackets 21 may be bolted to the lower surface of the side frame 3, for example. In this way, the support member 20 can be easily connected to the side frames 3 and 5 via the bolt 30B even when the installation space or the like is restricted.

In the third embodiment, as in the second embodiment, the divided battery packs 10A,10B, . . . directly connected to the side frames 3 and 5 are connected by the elastic members 40. However, the present disclosure is not limited thereto, and the divided battery pack 10A,10B, . . . connected to the side frames 3 and 5 may be connected by the elastic member 40 via the support member 20, for example, as in the first embodiment.

Figure 10:
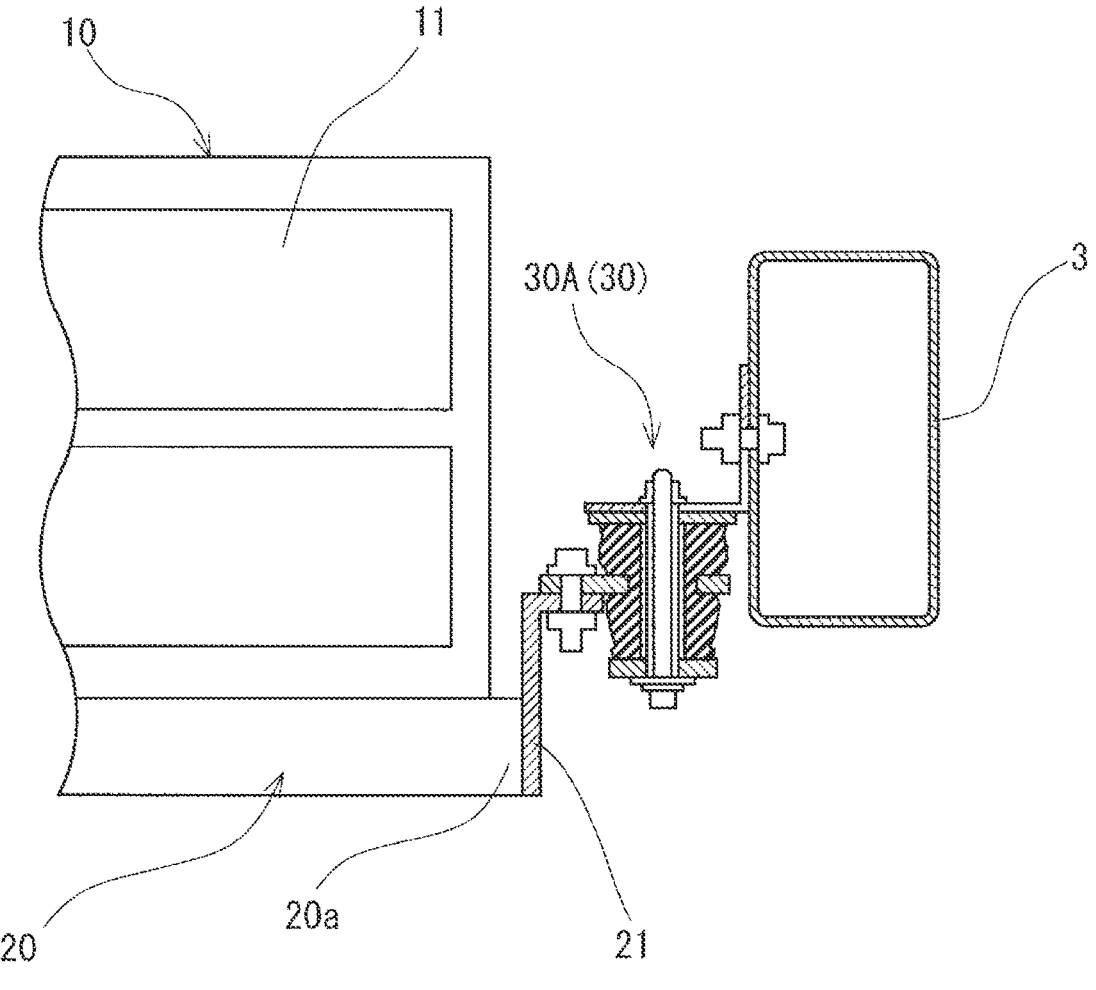
FIG. 10 is a cross-sectional view schematically illustrating an example of a mounting portion according to another embodiment.

Further, in each of the above embodiments, the mounting portion 30 is set on the lower surface of the side frame 3, not limited thereto, depending on the constraints such as installation space, for example, the mounting portion 30 may be set on the side surface of the side frame 3 as shown in FIG. 10. Although not shown, the mounting portion 30 may be set on the upper surface of the side frame 3.

Thus, the above-described embodiments are merely illustrative in all respects, and should not be construed as limiting. Furthermore, all variations and modifications falling within the equivalent scope of the claims are within the scope of the disclosure.

According to the present disclosure, it is possible to suppress the failure of the battery even when the torsion angle of the side frame becomes large, it is very useful to apply to the battery mounting structure of the frame vehicle that supports the battery pack by the side frame.

What is claimed is:

1. A battery mounting structure of a frame vehicle, the battery mounting structure comprising:

a pair of a right side frame and a left side frame provided in the frame vehicle and extending in a vehicle front-rear direction;

five battery packs arranged in the vehicle front-rear direction, a first end and a second end of each of the battery packs being connected to the right side frame and the left side frame, respectively;

five support members extending in a vehicle width direction, each support member having a hollow rectangular cross section, each support member supporting a respective battery pack, and each support member extending over the right side frame and the left side frame;

ten mounting portions, two for each one of the five support members, each mounting portion comprising a cylindrical collar, an upper plate fixed to an upper end portion of the cylindrical collar, the upper plate being connected to a lower surface of the corresponding side frame by a first bolt inserted into the cylindrical collar, a lower plate fixed to a lower end portion of the cylindrical collar, a rubber portion provided so as to cover an outer periphery of the cylindrical collar and bonded to the upper plate and the lower plate, and a middle plate attached to a middle portion of the rubber portion; and ten brackets, two for each one of the five support members, each bracket being provided at a respective end of the respective support member in the vehicle width direction, each bracket being fastened to the middle plate by a second bolt, wherein the battery packs adjacent to each other in the vehicle front-rear direction are connected to each other via an elastic member made of a rubber around an axis in the vehicle front-rear direction.

2. The battery mounting structure of a frame vehicle according to claim 1, wherein the number of battery packs is determined based on a torsion angle threshold such that the maximum torsion angle of the side frames during vehicle operation does not exceed the torsional tolerance of each battery pack.

* * * * *